United States Patent [19]

Scott

[11] E Re. 29,860

[45] Reissued Dec. 12, 1978

[54] ROTARY POTENTIOMETER WITH SPEED REDUCTION GEARING

[75] Inventor: Larkin B. Scott, Fort Worth, Tex.

[73] Assignee: The Perkin-Elmer Corporation, Norwalk, Conn.

[21] Appl. No.: 846,630

[22] Filed: Oct. 28, 1977

Related U.S. Patent Documents

Reissue of:

[64] Patent No.: 3,129,382
Issued: Apr. 14, 1964
Appl. No.: 847,958
Filed: Oct. 22, 1959

[51] Int. Cl.[2] ..... G05F 1/14
[52] U.S. Cl. ..... 323/43.5 R
[58] Field of Search ..... 323/43.5 R

[56] References Cited

U.S. PATENT DOCUMENTS

| | | | |
|---|---|---|---|
| 2,572,545 | 10/1951 | Walker | 323/43.5 R |
| 2,712,110 | 6/1955 | Peterson | 323/43.5 R |
| 2,791,648 | 5/1957 | Maloney | 200/18 |
| 2,813,159 | 11/1957 | Johnson et al. | 200/17 |
| 2,843,822 | 7/1958 | Scott | 323/43.5 R |
| 2,948,165 | 8/1960 | Luthi | 74/804 |
| 2,972,910 | 2/1961 | Menge | 74/804 |
| 3,028,513 | 4/1962 | Sundt | 74/804 X |

*Primary Examiner*—A. D. Pellinen
*Attorney, Agent, or Firm*—Salvatore A. Giarratana; Francis L. Masselle; John D. Crane

[57] *ABSTRACT*

*A rotary potentiometer with speed reduction gearing. A multi-tap closed loop distributed impedance is coupled by a mechanical configuration including a shaft to selected taps on an autotransformer. The mechanical coupling configuration permits the output from the wiper on the closed loop distributed impedance to change as a function of shaft position and to jump from one end of the autotransformer to the other while the shaft is continuously rotated in a given direction.*

8 Claims, 10 Drawing Figures

Fig. 1.
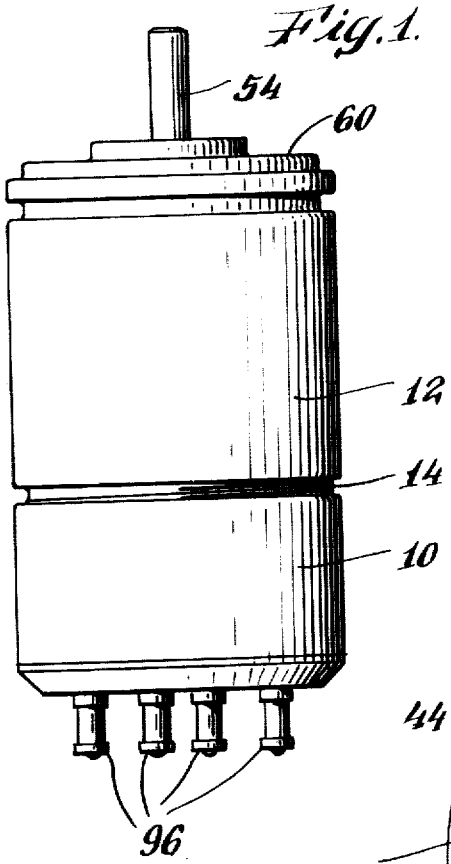
Fig. 2.
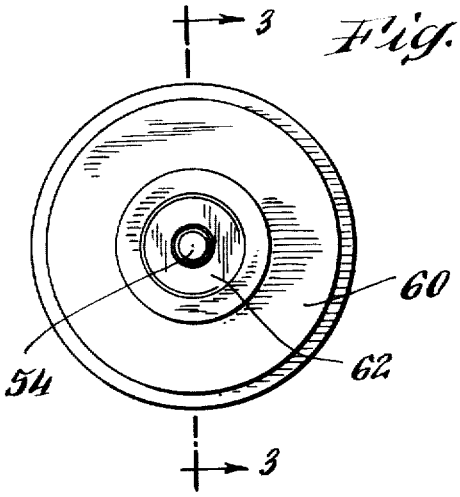
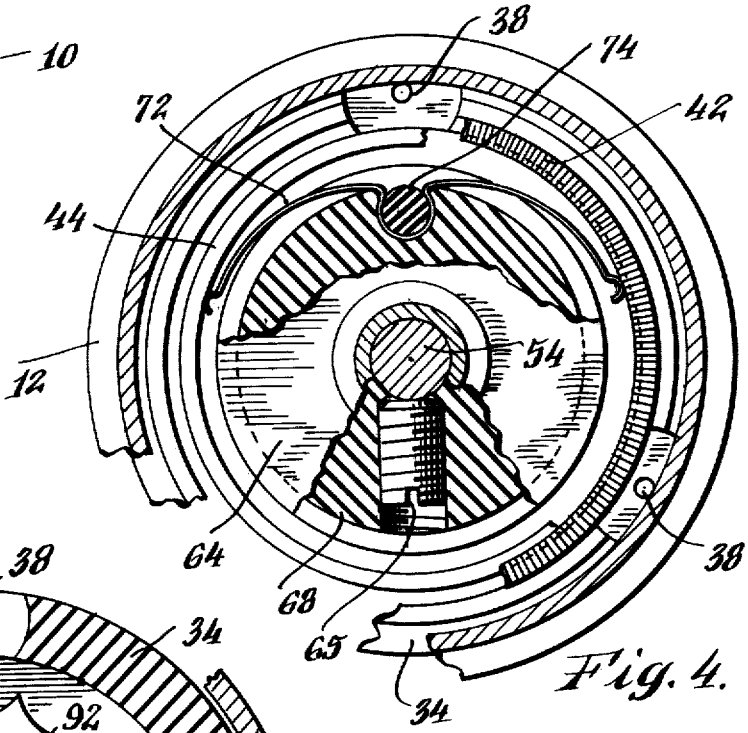
Fig. 4.
Fig. 5.
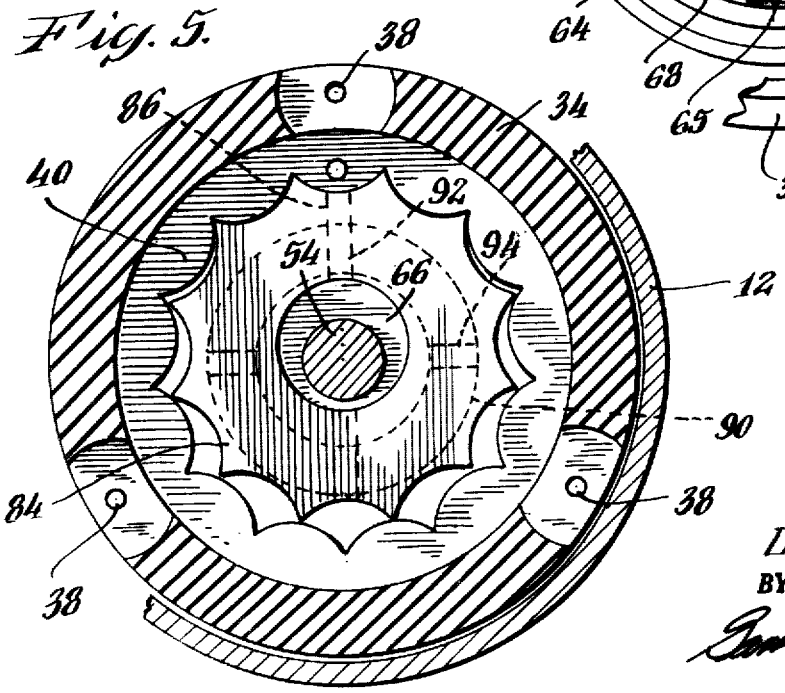
INVENTOR.
Larkin B. Scott
BY
Gerald E. Brandlect Jr.
ATTORNEY.

INVENTOR.
Larkin B. Scott
BY
Gerald E. Bramblett Jr.
ATTORNEY.

Fig. 7.
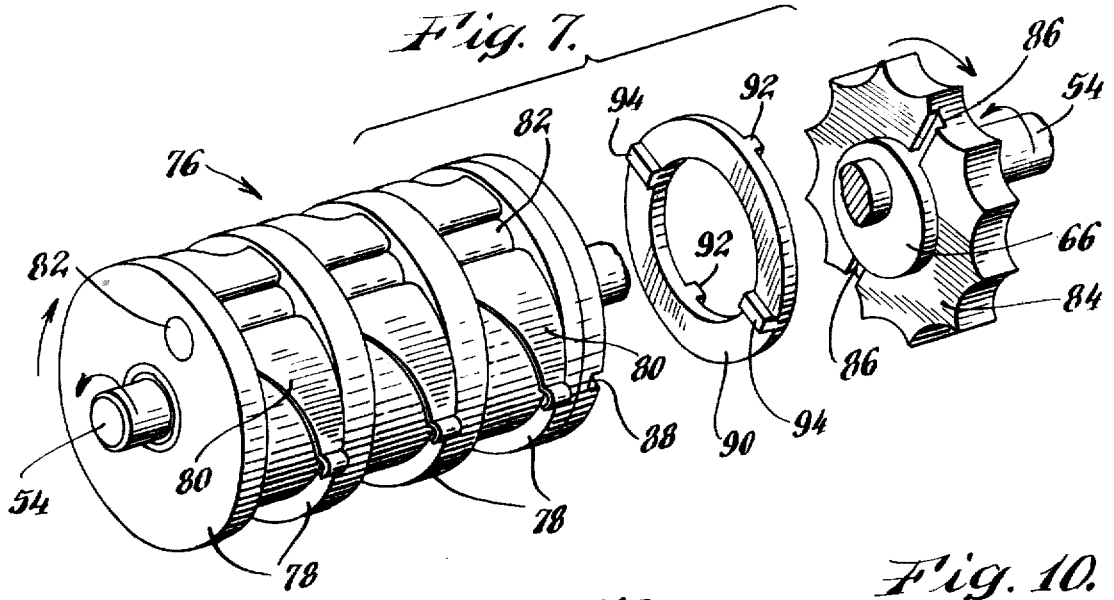
Fig. 10.
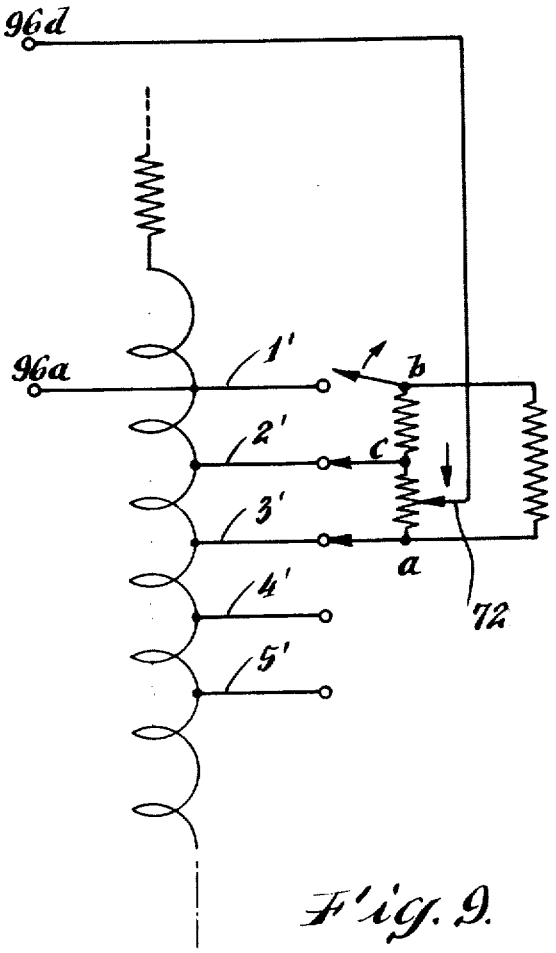
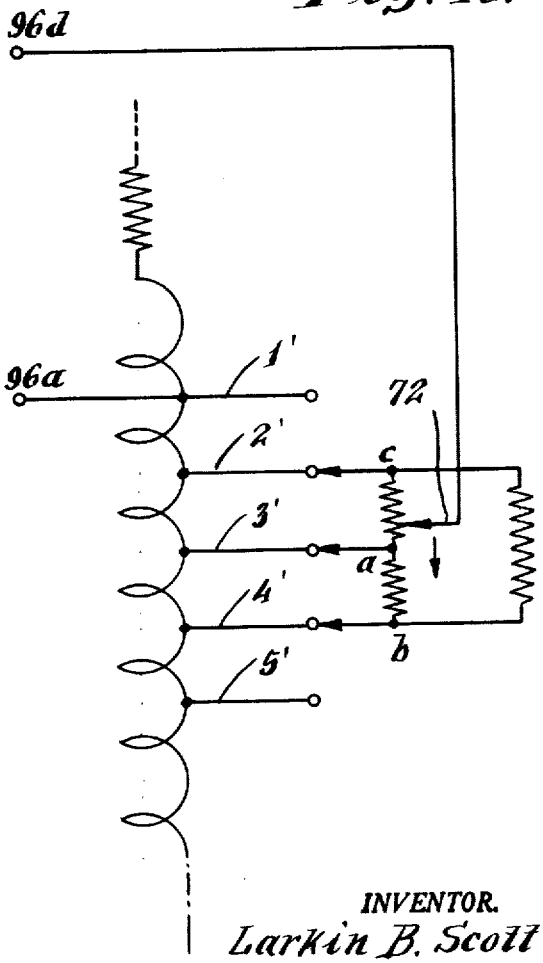
Fig. 9.
INVENTOR.
Larkin B. Scott
BY
Gerald E. Bremilla Jr.
ATTORNEY.

INVENTOR.
Larkin B. Scott
BY
Gerald E. Bremblet Jr.
ATTORNEY.

ROTARY POTENTIOMETER WITH SPEED REDUCTION GEARING

Matter enclosed in heavy brackets [ ] appears in the original patent but forms no part of this reissue specification; matter printed in italics indicates the additions made by reissue.

This invention relates to precision transducers for use in electrical apparatus and, more particularly, to such a transducer having novel features especially adaptable to miniaturization.

A novel precision transducer having great utility in many electrical applications is disclosed and claimed in my U.S. Pat. 2,843,822 which issued July 15, 1958. The apparatus disclosed therein utilizes the nutating motion of an eccentric gear for successively connecting the taps of a closed impedance loop across various terminals of a potentiometer or autotransformer. A wiper is rotated against the impedance loop for the purpose of obtaining a voltage output intermediate successive terminals.

The precision transducer described in the aforementioned patent has great resolution, smoothness, and linearity. Due to its inherent capabilities, it is of particular significance in applications involving control systems for missiles and aircraft. However, the nature of the mechanical movement disclosed in the patent is such that the minimum external diameter is limited. Reference to the patent, in particular to FIG. 5 thereof, will indicate the reason for the limitation. Three radial tongues are located on a gear within a gear and extend outwardly to contact the various terminals located circumferentially around the periphery of the outer annular gear. The diameter of the gears is practically limited by cost considerations. The cost of special gear configurations rapidly becomes prohibitive as size is decreased. However, the novel nutating gear arrangement offers an extremely favorable speed reduction ratio with an absolute minimum of parts. The nutating motion of the inner gear, however, although particularly well suited to a switching mechanism of the type disclosed in the patent, does not produce rotary motion directly about a stationary axis.

It is, therefore, a primary object of the present invention to provide a precision electrical transducer capable of a high degree of miniaturization. Other objects are to provide such a transducer utilizing a nutating gear for speed reduction purposes; to provide such a transducer having a cylindrical segmented commutator portion; and to provide such apparatus utilizing rotating bridging means contacting the commutator segments.

The manner in which the above objectives are achieved will be apparent by reference to the following description, the appended claims, and the figures of the attached drawings wherein:

FIG. 1 is an elevational view of one form of precision transducer embodying the invention;

FIG. 2 is a plan view of the apparatus shown in FIG. 1;

Figures 3, 6:
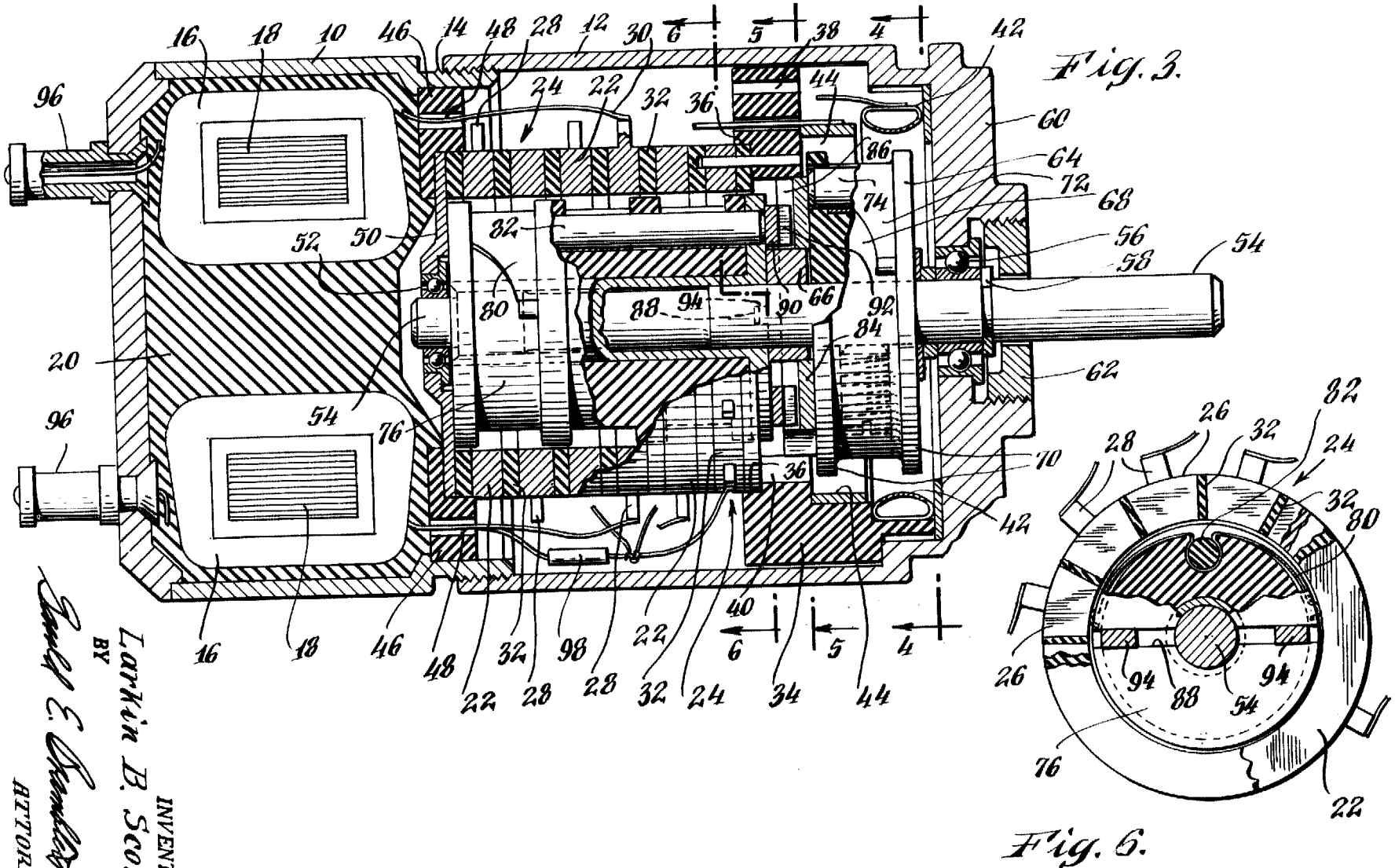
FIG. 3 is a sectional elevational view taken along line 3—3 of FIG. 2.
Figure 8:
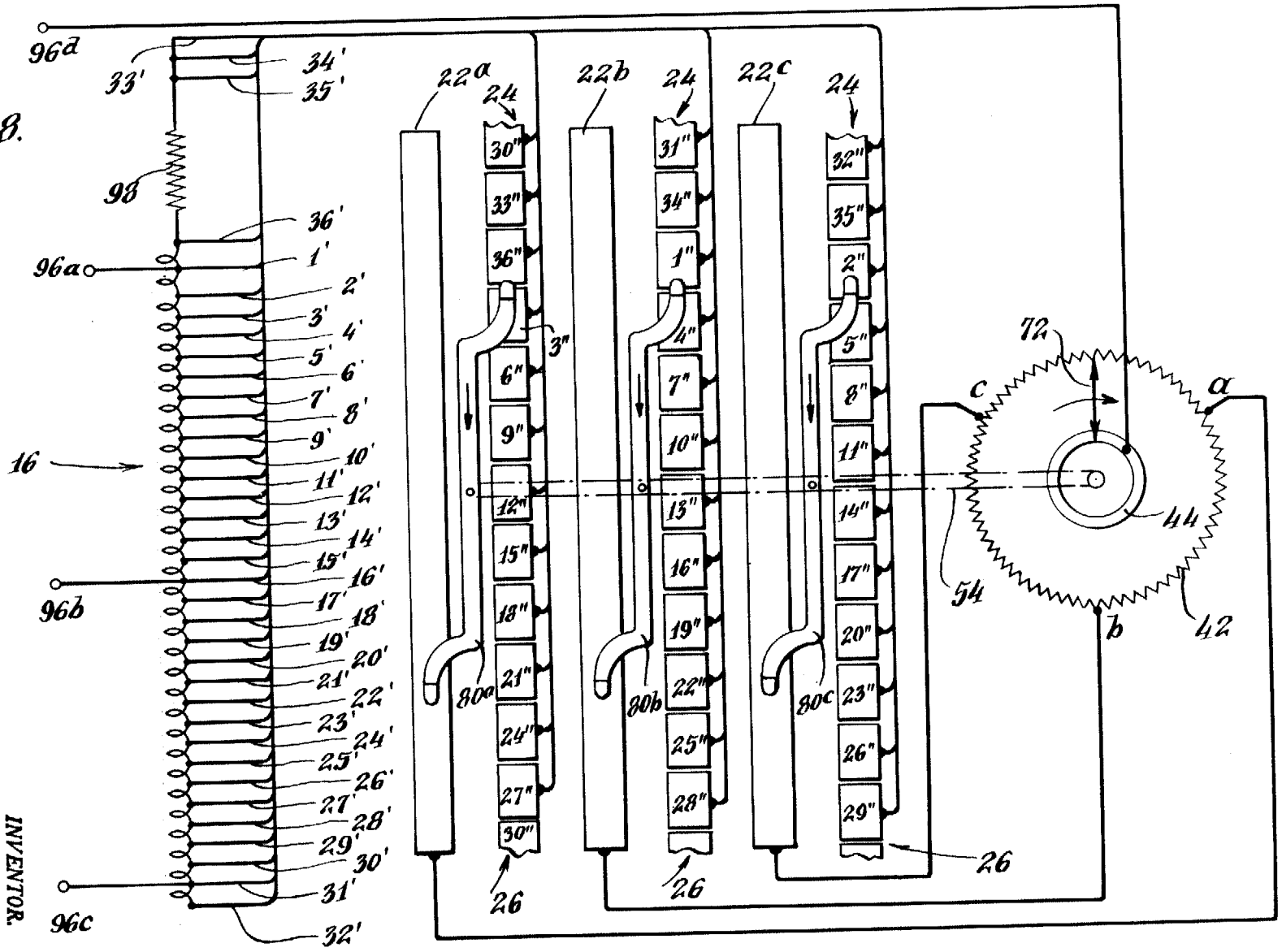

FIGS. 4, 5, and 6 are sectional plan views taken along lines 4—4, 5—5, and 6—6 respectively of FIG. 3;

FIG. 7 is an exploded perspective view of the rotor, coupler, and speed reducer of the invention;

FIG. 8 is a schematic representation of the circuit diagram of the present invention illustrating the cylindrical commutator as it would appear if "rolled out" in a plane; and FIGS. 9 and 10 are enlarged schematic illustrations showing the manner in which the switching function of the apparatus is effected.

With particular reference to FIG. 3 it will be seen that the apparatus of the invention is enclosed in a shell having a base portion 10 and an upper portion 12 held together by a threaded portion 14. Shell base 10 encloses an autotransformer 16 on a core 18 embedded in a supporting and insulating medium 20.

Upper portion 12 of the shell encloses a stator-rotor combination. The stator comprises a hollow cylinder constructed of three solid electrically conductive rings 22 alternately stacked with three segmented rings 24. Each of segmented rings 24 is constructed of electrically conductive segments 26. Tabs 28 are provided for connecting each ring and segment to electrical conductors 30. Rings 22 and 24, as well as segments 26, are insulated from one another by insulating material 32. A spacer 34 supports one end of the stator on a circumferential shoulder 36. Three holes 38 are provided in spacer 34 for three conductors connecting rings 22 with element 42. The inner surface of spacer 34 is cut in the shape of an annular gear 40 as will be more apparent from an examination of FIG. 5.

Additional stator elements located within shell 12 are a toroidal potentiometer coil 42 and a solid collector ring 44. Coil 42 is designed as shown in the cross section of FIG. 3. The outer circumference of the coil is substantially cylindrical. The inner circumference, however, has a convex arched configuration which causes the individual conductors to lie closer together to form a more precise wiping surface. A spacer 46 is located within shell base 10 and contains holes 48 to allow the passage of wires 30 between autotransformer 16 and segments 26. An annular support member 50 is supported by spacer 46 and in turn supports bearing 52 and the inner end of shaft 54. The outer end of shaft 54 is supported by bearing 56 and thrust collar 58 retained in end cap 60 of shell 12 by screw plug 62.

Shaft 54 rotates freely within bearings 52 and 56 and has fixedly secured to its surface a circular eccentric 66 and a rotor element 64 which is secured by set screw 65 (FIG. 4). Rotor 64 is spool-shaped as shown in FIG. 3. The reduced diameter inner portion 68 between flanges 70 will be seen to overlap portions of both coil 42 and collector ring 44. A spring-like wiper arm 72 (FIG. 4) is offset from its longitudinal center line at each end (see (FIG. 3) to contact both coil 42 and collector ring 44. The wiper arm is retained on rotor element 64 by means of a pin 74 extending through element 64 and supporting wiper arm 72 as shown in FIG. 4. To provide proper gripping action it is essential that the center line of pin 74 be positioned radially inward from surface 68 of element 64.

Rotor element 76 (shown partially cut-away in FIG. 3 and in perspective in FIG. 7) has an inner bearing surface and rotates freely on the surface of shaft 54. Rotor element 76 has three reduced diameter portions separated by flanges 78. Each of the reduced diameter portions bridges a solid ring 22 and a segmented ring 24. On each of the reduced diameter portions is a wiper arm 80 having a configuration similar to wiper arm 72 and secured by an elongated pin 82 in the manner in which wiper arm 72 is secured to element 64. The offset formed at each end of each of wiper arms 80 causes the arm to electrically bridge a solid ring 22 and a segmented ring 24.

Circular eccentric portion 66 of shaft 54 has an external bearing surface. Mounted to rotate on this bearing surface is a spur gear 84 which meshes with, but has a smaller diameter than, annular gear 40. The relationship of gears 40 and 84 will be more clearly seen by reference to FIG. 5. Rectangular grooves 86 (FIG. 7) are cut on the inner surface of gear 84. Similar grooves 88 are cut on the outer surface of rotor 76. An annular coupling ring 90 is located between gear 84 and rotor 76. Ring 90 is provided on one side with rectangular shoulders 92 designed to fit within and be easily slidable along grooves 86. Shoulders 94 are provided on the opposite side of ring 90 but are positioned approximately 90° from shoulders 92. Shoulders 94 are similarly designed to fit within and be easily slidable along grooves 88. The center opening of ring 90 is made large enough to permit the coupling action described below to take place. The size of this opening will be seen to be a function of the ratio of the diameter of spur gear 84 to the diameter of annular gear 40.

Input and output terminals 96 are provided on the base of the apparatus as shown in FIGS. 1 and 3.

Enclosed within shell 12 is a resistor 98. Resistor 98 is connected between one end tap of transformer 16 and one segment 26 in each of segmented rings 24.

It will be seen that turning shaft 54 will cause direct rotation of rotor 64 and its wiper arm 72. Since the shaft and the rotor are unitary, the wiper will make a complete traversal of potentiometer coil 42 with each turn of the shaft. Since arm 72 contacts both coil 42 and collector ring 44, the collector will be seen to be electrically connected to successive points along coil 42. Collector ring 44 is, in turn, connected to one of output terminals 96, as will be apparent from FIG. 8.

Eccentric element 66 is similarly fixed to shaft 54 so that it is rotated about the shaft once for each revolution of the shaft. As described above, spur gear 84 is rotatable about eccentric 66 and meshes within annular gear 40 as shown in FIG. 5. Rotation of shaft 54 causes gear 84 to roll about the inner surface of gear 40. Inspection of FIG. 5 will indicate that as shaft 54 rotates in one direction, gear 84 will rotate slowly in an opposite direction and advance one tooth pitch. Thus a gear ratio of 12.1 (in the illustrated embodiment) is simply and easily achieved. It will also be apparent that the rotation of gear 84 is not concentric about the axis of shaft 54. In order to convert this motion to rotation concentric about shaft 54, a coupler of the type shown in FIG. 7 is employed. Since rotor 76 rotates about shaft 54 as on a bearing, it is constrained to rotate about the axis of shaft 54. Element 90 "floats" freely within grooves 86 and 88 and changes the speed-reduced, eccentric rotation of gear 84 to a concentric rotation at the same speed.

The electrical operation of this apparatus will be more apparent from FIGS. 8, 9, and 10. An autotransformer 16 is divided into 32 equal segments by a total of 33 taps having conductors numbered consecutively 1'–32' and 36'. Each of these conductors is connected to a correspondingly numbered commutator segment 1"–32" and 36". In addition, three segments numbered 33", 34", and 35" are connected by conductors 33', 34' and 35' to resistor 98.

Input terminals 96a and 96c are provided one tap removed from each end of transformer 16. A center tap 96b is also provided. Output terminal 96d is connected to collector ring 44.

In the illustration of FIG. 8, wiper arm 72 is rotating in a clockwise direction about potentiometer 42. Elements 80a, 80b, and 80c are moved downwardly (counterclockwise) at a slower rate than wiper 72. At the instant illustrated, tap c of potentiometer 42 is connected through slip ring 22c, wiper 80c, and segment 2" to transformer tap conductor 2'. Tap a is similarly connected to transformer tap conductor 3'. Tap b is in the act of switching from transformer tap 1' to 4'. Electrically, therefore, wiper 72 is at the midpoint of a potentiometer connected between taps 2' and 3' of autotransformer 16. This circuit is illustrated in the enlarged schematic of FIG. 9. As wiper 72 continues beyond the midpoint of potentiometer c–a, wiper 80b will slide onto segment 4", thus connecting tap b to 4' as shown in FIG. 10. The circuit of FIG. 10 will remain until wiper 72 passes the midpoint of potentiometer a–b when the transfer of wiper 80c from segment 2' to segment 5' will repeat the cycle.

In order to preserve the slope of output voltage versus shaft rotation at the extreme ends of the autotransformer, tap conductors 36' and 32' are provided externally of input terminals 96a and 96b. It is also to be noted that if there were exactly the same number of segments as transformer taps, each of wipers 80a and 80c would have to switch nearly full line voltage at some point of its travel. For example, if segment 35" did not exist, full line voltage would exist between adjacent segments 32" and 2" which could create switching problems. By inserting segments 33", 34", and 35", not connected to transformer taps, neutral position is provided for each wiper element prior to starting a new sequence.

The mere insertion of segments 33", 34", and 35" is of great help in avoiding the problem of switching full line voltage. However, without more, segments 33", 34" and 35" are not tied down to a specific ground and will tend to "float" without control. In order to prevent this, a resistor 98 is provided between the end tap of the autotransformer and each of the additional segments in order to tie them to a specific reference. In the described embodiment, this resistance has a value of 100,000 ohms.

In the illustrated embodiment, the gear ratio between shaft 54 and rotor 76 is 12:1. Potentiometer wiper arm 72 makes one complete revolution for each switching action accomplished by a wiper 80. It will thus be noted that the number of segments in each segmented ring is the same as the gear ratio between shaft and rotor. This is also equal to the number of teeth on the inner gear 84. Outer gear 40 has one more tooth.

It will be readily apparent to those skilled in the art that the novel precision transducer disclosed herein has many uses in the control of electrical quantities. Further, it will be equally apparent that many modifications may be made in the apparatus of the invention without departing from the spirit and scope thereof. It is to be understood that the foregoing is to be construed as descriptive rather than limiting. The invention is limited only by the scope of the following claims.

I claim:

1. In electrical apparatus having a series of terminals, one of which is a reference terminal, means for maintaining a reference voltage on the reference terminal and voltages of predetermined values relative to the reference voltage on the respective other terminals along the series, means for deriving voltages intermediate those on the terminals including a continuous electrical path in the form of a closed loop of distributed impedance subdivided into sections by taps at at least three substantially equally spaced points thereon, switching means for connecting pairs of adjacent taps in rotation across successive pairs of adjacent terminals along the series, and a contact movable along that section of the impedance loop between the taps on said section connected to a first and second terminal, the improvement comprising switching means having at least three first conductive elements; each connected to one of said taps, a plurality of second conductive elements, each connected to one of said terminals, said first and second [terminals] *conductive elements* comprising at least a portion of the surface of a substantially cylindrical drum; and electrical bridging means movable to interconnect each of said first conductive elements with one of said second conductive elements.

2. The apparatus of claim 1 wherein said first and second conductive elements are positioned on the inner surface of said drum.

3. The apparatus of claim 2 wherein said bridging means rotates about the longitudinal axis of said drum and against the inner surface thereof.

4. The apparatus of claim 1 wherein each of said first conductive elements is a circular washer-like annulus and is in stacking relationship with said second conductive elements, said second conductive elements being positioned to form at least one circular washer-like annulus, and electrically insulating material in separating relationship between said first and second conductive elements.

5. The apparatus of claim 1 wherein said electrical bridging means comprises a plurality of electrically conductive segments supported by a non-conductive rotor; rotor driving means comprising a driving shaft having thereon a bearing surface eccentrically disposed to the longitudinal axis of said shaft; first gear means concentric with said bearing surface and rotatable thereon; second gear means fixed with respect to said drum and encircling said first gear means, said second gear means being in concentric relationship with said driving shaft and having a portion of its inner surface meshing with a portion of the outer surface of said first gear means; and coupling means between said first gear means and said rotor for transferring the rotary motion of said first gear means to said rotor.

6. The apparatus of claim 1 wherein said bridging means comprises a substantially cylindrical rotor having on the surface thereof a plurality of spaced circumferential projections, said surface defining a groove substantially parallel to the longitudinal axis of said rotor and extending between said projections, and each of said projections defining a hole having an axis of symmetry coradial with and parallel to the longitudinal axis of said groove; rod-like locking means extending through and between said holes and positioned at least partially within said groove; and elongated, flat, electrically conductive blade means positioned between said locking means and said groove, the ends of said blade means being in contacting relationship with said first and second conductive elements.

7. The apparatus of claim 1 wherein said bridging means comprises a substantially cylindrical electrically non-conductive rotor having on the surface thereof a plurality of spaced circumferential projections, said surface defining a groove substantially parallel to the longitudinal axis of said rotor and extending between said projections, and each of said projections defining a hole having an axis of symmetry colinear with the longitudinal axis of said groove; rod-like electrically non-conductive locking means extending through and between said holes and positioned at least partially within said groove; and elongated, flat, electrically conductive blade means positioned between said locking means and said groove, the ends of said blade means being in contacting relationship with said first and second conductive elements.

8. Electrical switching apparatus comprising a first hollow cylindrical stator member; an inner rotor member; and rotor driving means; said stator member comprising at least one circular washer-like electrically conductive annulus in stacking relationship with at least one set of electrically conductive elements positioned to form a circular washer-like annulus, and electrically insulating material in separating relationship between said annuli and said elements; said rotor member comprising an electrically non-conductive cylinder having on the surface thereof a plurality of spaced circumferential projections, said surface defining a groove substantially parallel to the longitudinal axis of said rotor and extending between said projections, and each of said projections defining a hole having an axis of symmetry colinear with the longitudinal axis of said groove, rod-like electrically non-conductive locking means extending through and between said holes and positioned at least partially within said groove, and elongated flat electrically conductive blade means positioned between said locking means and said groove, the ends of said blade means being in contacting relationship with the inner surface of said cylindrical stator member; and said rotor driving means comprising a driving shaft colinear with said rotor having thereon a bearing surface eccentrically disposed to the longitudinal axis of said shaft, substantially circular driving means concentric with said bearing surface and rotatable thereon, annular track means encircling said circular driving means in concentric relationship with said driving shaft, fixed with respect to said stator and having a portion of its inner surface in engaging relationship with a portion of the outer surface of said circular driving means whereby rotation of said driving shaft causes said circular driving means to roll about the inner surface of said annular track means, and coupling means for transferring the rolling motion of said circular driving means to rotation of said rotor.

* * * * *